(12) United States Patent
Rich

(10) Patent No.: X8725
(45) Date of Patent: Mar. 27, 1835

(54) SAW MILL, DOG GAUGE

(76) Inventor: Martin Rich

Martin Rich Caroline N. York.

Letters Patent

The Schedule referred to in these Letters Patent and making part of the same containing a description in the words of the said Martin Rich himself of his improvement on iron dogs for a Saw Mill called the guage Saw Mill dog To all to whom these presents shall come. Be it known that I Martin Rich of the Town of Caroline in the County of Tompkins and State of New York have invented a new and useful improvement in iron dogs for a Saw Mill called the guage dog for a Saw Mill and that the following is a full and exact description of the construction and operation of said machine as invented or improved by me. First. Two cast iron plates two feet long six inches wide placed upon the head and tail blocks of the saw mill six inches apart and confined with iron bolts or spikes. Three eyes placed or cast upon the top of each plate one at each end of the plate and the third six inches from one end. On the centre of the plate a piece of cast Iron is cast or bolted two inches high on which to fasten the spring. Holes are drilled through the eyes to receive the half bails. Two half bails made of wrought or cast iron two feet long and eight inches high are fastened by gudgeons four inches long to the eyes The gudgeons are cast with the half bails and turned so as to exactly fit the holes in the eyes and are attached to the half bails in one of the half bails is three teeth placed in manner following. two of the teeth upon the inside from two to four inches apart and one tooth in the middle of the two teeth placed horizontally so as to keep the log down firm to the head block On the other half bail there is but one tooth eight inches long. the inside part of which is driven into the log to keep it firm and the outside operates as a guage to guage the board to any given thickness that the Sawyer may desire ~~and~~ ~~the~~ A Screw made of cast or wrought iron six inches long is to be [illegible]

at the end of each half Bail running through the eyes so as to screw against the end of the half Bail to regulate the thickness of the lumber to be sawed. A Spring made of cast steel six inches long fastened upon one of the pieces of cast or wrought iron on the middle of the plate containing the half bail with three teeth and presses upon the inside of the half bail so as to throw it back against the end of the screw before the half bail is driven into the end of the log. then by its pressure against the half bail prevents its being moved too far and enabling the sawyer to make his boards of equal thickness without any stub shot.
If preferred by the sawyer the spring can be removed and the half bail guarded by the screw alone. If preferred square blocks of cast iron can be substituted for the screw at each end of the half bail and thus regulate the thickness of the board. In testimony whereof I have hereunto set my hand and name the twenty third day of February 1835

[illegible]

Witnesses
John Stephens
Frederick G. Stanley

Martin Rich

[illegible]